US006824623B1

United States Patent
Gross et al.

(10) Patent No.: US 6,824,623 B1
(45) Date of Patent: Nov. 30, 2004

(54) GRAFFITI REMOVER, PAINT STRIPPER, DEGREASER

(75) Inventors: Stephen F. Gross, Souderton, PA (US); Martin J. Barabash, Jamesburg, NJ (US); J. Frederick Hessel, Doylestown, PA (US)

(73) Assignee: Cognis Corporation, Cincinnati, OH (US)

( * ) Notice: Subject to any disclaimer, the term of this patent is extended or adjusted under 35 U.S.C. 154(b) by 376 days.

(21) Appl. No.: 09/643,141

(22) Filed: Aug. 22, 2000

Related U.S. Application Data

(60) Provisional application No. 60/155,330, filed on Sep. 22, 1999.

(51) Int. Cl.$^7$ ................................................. B08B 3/00
(52) U.S. Cl. ................ 134/36; 134/2; 134/35; 134/40; 134/42; 510/210; 510/245; 510/405; 510/421; 510/422; 510/424; 510/426; 510/428; 510/429; 510/437; 510/432; 510/495; 510/498; 510/203; 510/206; 510/212; 510/108
(58) Field of Search ............................. 134/2, 35, 36, 134/40, 42, 3, 38, 41; 510/210, 245, 421, 405, 422, 424, 426, 428, 429, 437, 432, 495, 498, 203, 206, 212, 108

(56) References Cited

U.S. PATENT DOCUMENTS

| | | | |
|---|---|---|---|
| 3,709,825 A | * 1/1973 | Chirash et al. | ............... 134/38 |
| 4,666,626 A | 5/1987 | Francisco | |
| 4,968,447 A | 11/1990 | Dixon et al. | ............ 252/174.23 |
| 5,011,621 A | 4/1991 | Sullivan | ...................... 252/162 |
| 5,308,530 A | * 5/1994 | Aronson et al. | ............. 510/321 |
| 5,585,341 A | * 12/1996 | Van Eenam | ................. 510/365 |
| 5,877,133 A | * 3/1999 | Good | .......................... 510/175 |
| 5,952,287 A | * 9/1999 | Gross et al. | ................. 510/181 |
| 5,972,866 A | * 10/1999 | Ahmed | ........................ 510/218 |
| 5,990,072 A | * 11/1999 | Gross et al. | ................. 510/201 |
| 6,060,441 A | * 5/2000 | Hessel et al. | ................ 510/320 |
| 6,072,031 A | * 6/2000 | Pastan et al. | ................ 530/350 |
| 6,150,282 A | 11/2000 | Rath et al. | ................... 438/746 |
| 6,180,583 B1 | * 1/2001 | Cilley et al. | ................. 510/373 |
| 6,224,685 B1 | * 5/2001 | Gross et al. | ............. 134/22.19 |

FOREIGN PATENT DOCUMENTS

| | | | |
|---|---|---|---|
| FR | 2 773813 | | 7/1999 |
| JP | 07 040344 | | 2/1995 |
| WO | WO 96/27642 | | 9/1996 |
| WO | WO 98/55567 | | 12/1998 |
| WO | WO0052128 | * | 9/2000 |
| WO | WO0121719 | * | 3/2001 |

* cited by examiner

*Primary Examiner*—Sharidan Carrillo
(74) *Attorney, Agent, or Firm*—Aaron R. Ettelman; Steven J. Trzaska; Daniel S. Ortiz

(57) ABSTRACT

A terpene-free cleaning composition containing: (a) an oil-soluble anionic surfactant; (b) a water-soluble anionic surfactant; (c) a primary solvent consisting of a $C_{1-4}$ alkyl ester; (d) a short-chain cosurfactant; and (e) water.

20 Claims, No Drawings

GRAFFITI REMOVER, PAINT STRIPPER, DEGREASER

CROSS-REFERENCE TO RELATED APPLICATIONS

This application claims the benefit of copending provisional application Ser. No. 60/155,330 filed on Sep. 22, 1999.

STATEMENT REGARDING FEDERALLY SPONSORED RESEARCH OR DEVELOPMENT

Not Applicable.

BACKGROUND OF THE INVENTION

The present invention generally relates to a cleaning composition. More particularly, the invention relates to a novel cleaning formulation having superior cleaning ability which is readily biodegradable, low in toxicity and volatility, neutral in pH and primarily naturally derived.

General purpose household cleaning compositions for hard surfaces such as metal, glass, ceramic, plastic and linoleum surfaces are commercially available in both powdered and liquid form. Powdered cleaning compositions consist mainly of builder or buffering salts such as phosphates, carbonates, and silicates and although such composition may display good inorganic soil removal, they exhibit inferior cleaning performance on organic soils such as greasy/fatty/oily soils.

Liquid cleaning compositions, on the other hand, have the great advantage that they can be applied onto hard surfaces in a neat or concentrated form so that a relatively high level of surfactant material is delivered directly to the soil. Moreover, it is a rather more straightforward task to incorporate high concentrations of anionic or nonionic surfactant in a liquid rather than a granular composition. For both of these reasons, therefore, liquid cleaning compositions have the potential to provide superior grease and oily soil removal over powdered cleaning compositions.

Nevertheless, liquid cleaning compositions suffer a number of drawbacks which can limit their consumer acceptability. They generally contain little or no detergency builder salts and consequently they tend to have poor cleaning performance on particulate soil and also lack effectiveness under varying water hardness levels. In addition, they can suffer problems relating to homogeneity, clarity, and viscosity when used by consumers. Moreover, the higher in-use surfactant concentration necessary for improved grease and soil removal causes further problems relating to extensive suds formation which requires frequent rinsing and wiping on the part of the consumer.

One solution to the above-identified problems has involved the use of saturated and unsaturated terpenes, in combination with a polar solvent, in order to increase the cleaning effectiveness of the hard surface cleaner and control sudsing. A problem associated with the use of terpenes such as, for example, d-limonene, is that their price, as a raw material, tends to fluctuate wildly. Consequently, the cost to manufacture hard surface liquid cleaners containing terpene solvents is financially disadvantageous to both producers and consumers.

Other solvents which are often employed in hard surface cleaning compositions, instead of terpenes, include those derived from aliphatic, aromatic and halogenated hydrocarbons. Their use, however, is undesirable for environmental reasons due to their limited biodegradation.

Consequently, it would be highly desirable to employ a solvent which is both readily biodegradable and is not subject to any significant fluctuations in pricing for the raw material.

BRIEF SUMMARY OF THE INVENTION

The present invention is directed to a terpene-free cleaning composition containing:

(a) a $C_{1-4}$ alkyl ester of a $C_{6-22}$ saturated or unsaturated carboxylic acid; and (b) a cyclic ketone, wherein (a) and (b) are employed at a ratio by weight of from about 10:1 to about 1:10.

The present invention is also directed to a terpene-free cleaning composition containing:

(a) from about 2 to about 12% by weight of an oil-soluble anionic surfactant;

(b) from about 0.2 to about 6% by weight of a water-soluble anionic surfactant;

(c) from about 3 to about 96% by weight of a primary solvent consisting of a $C_6$–$C_{14}$ methyl ester;

(d) from about 2 to about 14% by weight of a short-chain cosurfactant; and (e) remainder, water, all weights being based on the total weight of the composition.

The present invention is also directed to a process for cleaning a substrate involving contacting the substrate with a cleaning-effective amount of either of the above-disclosed terpene-free cleaning compositions.

BRIEF DESCRIPTION OF THE SEVERAL VIEWS OF THE DRAWING

NOT APPLICABLE.

DETAILED DESCRIPTION OF THE INVENTION

Other than in the operating examples, or where otherwise indicated, all numbers expressing quantities of ingredients or reaction conditions used herein are to be understood as being modified in all instances by the term "about".

The removal of undesirable aged paints, coatings, greases, and the like from various substrates is accomplished by two mechanisms, namely, dissolution and lifting. Dissolution is when the undesirable material is dissolved from the substrate by a solvent. Lifting is when the solvent penetrates into the undesirable material and causes it to swell. As a result of the swelling the material, whether it be a paint, coating or the like, wrinkles and lifts (separates) from the substrate, allowing it to then be easily removed from the substrate's surface.

It has surprisingly been discovered that a highly effective cleaning composition, free of terpenes, which possesses both the dissolution and lifting mechanisms, can be formulated by combining a $C_{1-4}$ alkyl ester of a $C_{6-22}$ saturated or unsaturated carboxylic acid, acting as a primary solvent to facilitate dissolution, with a cyclic ketone which provides the lifting mechanism.

The primary solvent used in the present invention is a $C_{1-4}$ alkyl ester of a $C_{6-22}$ saturated or unsaturated carboxylic acid. The use of an alkyl ester as a solvent in cleaning compositions is significantly more desirable than conventional solvents, such as terpenes and hydrocarbon derivatives, for both environmental and economic reasons.

A particularly preferred $C_{1-4}$ alkyl ester of a $C_{6-22}$ saturated or unsaturated carboxylic acid for use in the present invention is a methyl ester corresponding to formula I:

$$R_1COOCH_3 \quad (I)$$

wherein $R_1$ is an alkyl radical having from about 6 to about 14 carbon atoms. They are derived by the esterification of a fatty acid with methanol. Preferred methyl esters are those derived from the esterification of unsaturated fatty acids having from about 8 to about 10 carbon atoms. Suitable fatty acids from which the fatty acid esters may be derived include, but are not limited to, coconut and other vegetable oils, tallow, etc.

Suitable cyclic ketones for use in the cleaning composition of the present invention include, but are not limited to, cyclopentanone, cyclohexanone, cycloheptanone, and the like. A particularly preferred cyclic ketone is cyclohexanone.

According to one embodiment of the present invention, there is thus provided a terpene-free cleaning composition containing: (a) a $C_{1-4}$ alkyl ester of a $C_{6-22}$ saturated or unsaturated carboxylic acid, preferably a $C_{6-14}$ methyl ester; and (b) a cyclic ketone, preferably a cyclohexanone, wherein (a) and (b) are employed at a ratio by weight of from about 10:1 to about 1:10, and preferably about 2:1.

The above-disclosed composition can be applied onto any type of substrate having an undesirable paint, coating or other material thereon, in order to dissolve and/or lift it therefrom.

According to another aspect of the present invention, there is provided a terpene-free cleaning composition having improved high and low temperature stability which may also be easily rinsed from a cleaned surface. These properties are imparted to the composition through the use of oil-soluble and/or water-soluble anionic surfactants.

Suitable oil-soluble anionic surfactants which may be employed in the present invention include, but are not limited to, amine salts of dodecylbenzenesulfonic acid, calcium salts of dodecylbenzenesulfonic acid, and phosphate esters. A particularly preferred oil-soluble anionic surfactant is the isopropylamine salt of dodecylbenzenesulfonic acid.

Suitable water-soluble anionic surfactants which may be employed in the present invention include, but are not limited to, water-soluble salts of alkyl benzene sulfonates, alkyl sulfates, alkyl polyethoxy ether sulfates, paraffin sulfonates, alpha-olefin sulfonates and sulfosuccinates, alpha-sufocarboxylates and their esters, alkyl glyceryl ether sulfonates, fatty acid monoglyceride sulfates and sulfonates, and alkyl phenol polyethoxyether sulfates.

Other suitable water-soluble anionic surfactants include the water-soluble salts or esters of alpha-sulfonated fatty acids containing from about 6 to about 20 carbon atoms in the fatty acid group and from about 1 to about 10 carbon atoms in the ester group.

Particularly preferred anionic surfactants for use in the present invention include the isopropylamine salt of a $C_{10-14}$ alkyl benzene sulfonic acid, and/or a $C_{8-14}$ fatty alcohol sulfate.

In the event that an anionic surfactant is employed, it will typically be present in the composition in an amount of from about 0.1 to about 15% by weight, preferably from about 3 to about 12% by weight, and most preferably from about 5 to about 10% by weight, based on the weight of the composition.

Another consideration that needs to be taken into account when formulating a terpene-free cleaning composition in accordance with the present invention relates to the cost of each individual component. In order to reduce costs, it is advisable to introduce a certain amount of water into the composition, thereby reducing the amount of actives needed to formulate the cleaning composition.

However, in order to maintain a high level of cleaning capability in the water containing version of the cleaning composition, it is advisable that a co-surfactant, preferably a short-chain co-surfactant, also be employed in the composition.

Suitable short-chain co-surfactants for use in the present invention include, but are not limited to, $C_3$–$C_6$ alcohols, glycols, glycol ethers, pyrrolidones and glycol ether esters. A particularly preferred short-chain cosurfactant is propylene glycol n-butyl ether.

Thus, according to another embodiment of the present invention, there is provided a terpene-free cleaning composition containing: (a) from about 2 to about 12% by weight, preferably from about 4 to about 10% by weight, and most preferably from about 6 to about 8% by weight, of an oil-soluble anionic surfactant, (b) from about 0.2 to about 6% by weight, preferably from about 0.5 to about 3% by weight, and most preferably from about 1 to about 2% by weight, of a water-soluble anionic surfactant, (c) from about 3 to about 96% by weight, preferably from about 25 to about 65% by weight, and most preferably from about 40 to about 50% by weight, of a $C_6$–$C_{14}$ methyl ester solvent, (d) from about 2 to about 14% by weight, preferably from about 5 to about 12% by weight, and most preferably from about 8 to about 10% by weight, of a short-chain cosurfactant, and (e) remainder, water, all weights being based on the total weight of the composition.

The advantage of employing a cyclic ketone in the cleaning composition of the present invention is that it facilitates the removal of paints and coatings having a polymeric matrix such as, for example, polyurethane, epoxy, and alkyd enamels. Therefore, in those instance where the removal of polymeric coating compositions is desired, a cyclic ketone should be incorporated into the composition in an amount of from about 1 to about 35% by weight, preferably from about 5 to about 25% by weight, and most preferably from about 10 to about 20% by weight, based on the weight of the composition.

Since methyl esters are subject to hydrolysis under alkaline conditions, it is imperative that the pH of the hard-surface cleaning composition be less than about 9, and preferably in the range of from about 6 to about 9.

The terpene-free cleaning composition of the present invention may be employed as either a neat solution or a microemulsion. Its use as a microemulsion, however, affords it the greatest degree of cost/performance. In this form it is an oil continuous microemulsion characterized by a high level of thermal stability, ranging from about 10 to about 70° C. However, in order to achieve this level of thermal stability, the methyl ester component and water should be present in the composition in a ratio by weight of from about 50:1 to about 1:4, preferably from about 5:1 to about 1:2, and most preferably about 1.5:1.

Auxiliaries may be incorporated into the cleaning composition of the present invention without departing from the spirit thereof. Examples of suitable auxiliaries which may be used include, but are not limited to, nonionic surfactants, amphoteric surfactants, zwitterionic surfactants, pH buffering agents, corrosion inhibitors, dyes, perfumes, enzymes, preservatives, thickeners, hydrotropes, and the like.

According to another embodiment of the present invention, there is provided a process for cleaning a hard surface involving contacting the hard surface with the above-disclosed composition.

The cleaning compositions according to the invention can be used in a wide variety of applications which include, but are not limited to, the removal of grease, oil, ink, chewing gum and paint from hard and porous surfaces including all kinds of natural and synthetic fabrics in both industrial-institutional and consumer applications. Examples of the disparate types of applications include, but are not limited to, the use of the cleaning compositions according to the invention as water rinsable paint brush cleaners for brushes having both natural and synthetic bristles. Another use is as a cleaner for human skin and nails such as hand and finger nail cleaner for the removal of paints, greases, glues, nail polish and the like. The cleaning compositions according to the invention can also be used as a spot cleaner for removing grease, oil and paints from carpets and rugs and as a prespotter in laundry applications for the removal of stains from fabrics. Other applications include the removal of grease such as lithium and molybdenum greases from steel and concrete surfaces such as, for example, wheel bearings or garage floors having grease and oil stained tire tracks and the like. The cleaning compositions according to the invention can also be used to clean the concrete and metal surfaces of off-shore oil drilling platforms.

The cleaning compositions according to the invention can also contain an effective amount of odor masking agents such as natural products, for example, essential oils; aroma chemicals; perfumes and the like. Examples of natural products include, but are not limited to, ambergris, benzoin, castoreum, civet, clove oil, galbanum, jasmine, rosemary oil, sandalwood, and the like. Examples of aroma chemicals include, but are not limited to, isoamyl acetate (banana); isobutyl propionate (rum); methyl anthranilate (grape); benzyl acetate (peach); methyl butyrate (apple); ethyl butyrate (pineapple); octyl acetate (orange); n-propyl acetate (pear); ethyl phenyl acetate (honey). The cleaning compositions according to the invention can contain any combination of the above types of compounds. An effective amount of such odor masking agents in the cleaning compositions according to the invention is any amount necessary to produce an odor masking effect or reduce an unwanted odor to an acceptable level. Such an amount will be readily determinable by those skilled in the art. The amount of odor masking agent will typically vary from about 0.25% to about 2.50% by weight of the cleaning composition with the preferred amount being from about 0.4% to about 1.0%.

The cleaning compositions according to the invention can be packaged in a variety of containers such as steel, tin, and aluminum cans and plastic and glass bottles. The cleaning compositions can be applied by a variety of application means which include, but are not limited to, spraying such as in aerosol form or other spraying means such as by standard spray nozzles when used to remove dirt and grime from trucks and railroad cars; brush application; dipping; coating; application in gel form such as from a squeeze bottle or brush. The cleaning compositions according to the invention can be formulated in gel form by the addition of an effective amount of a gelling agent such as fumed silica, organic gums, polymers, copolymers, paraffin wax, bentonite clay, and cellulose ethers such as methyl cellulose and hydroxypropyl methyl cellulose commercially available as METHOCEL® cellulose ethers, trademark products of Dow Chemical.

An in-can corrosion problem can arise when the cleaning compositions according to the invention are packaged in cans. Cans, and particularly aerosol cans, are generally made from steel and are, therefore, susceptible to corrosion by products containing water. Products containing water, such as the composition according to the invention, require the addition of a corrosion inhibitor to prevent corrosion of the can and contamination of the formulation in the can. When the formulation according to the invention is in the form of a microemulsion, the microemulsion is susceptible to destabilization by the addition of ions to the formulation. It is therefore necessary to use a corrosion inhibitor that will not contribute to the destabilization of the microemulsion. Corrosion inhibitors that are compatible with the microemulsion composition according to the invention must be selected such that they do not contribute an amount of ions to the formulation that will destabilize the microemulsion. Preferably the inhibitor will be a molecule that has both an oil soluble portion and a water soluble portion. It has been found that an amphoteric surfactant containing an amine functionality in an amount of from about 0.05% to about 2% by weight, and preferably from about 0.25 % to about 1.0%, acts as a corrosion inhibitor when combined with the microemulsion composition according to the invention, does not break the microemulsion and is effective in prevention of corrosion. Examples of suitable corrosion inhibitors include the DERIPHAT® amphoteric surfactants, particularly advantageous is DERIPHAT® 151-C, available from Henkel Corporation, Ambler Pa. Other corrosion inhibitors that can be used with the composition according to the invention include, but are not limited to, amine soaps of fatty acids and fatty alkanolamides such as the $C_8$ to $C_{18}$ fatty alkanolamides, examples of which include STANDAMID® alkanolamides, available from Henkel Corporation. Such corrosion inhibitors can also be used for post-application anti-corrosion effects on surfaces that will rust or corrode because of the presence of water in the cleaning compositions according to the invention such as on metal surfaces such as iron and steel and the like. The amount of the corrosion inhibitors required for post-application purposes is any amount effective to inhibit or prevent corrosion of a metal surface onto which the cleaning compositions according to the invention are applied.

It should be noted that additional auxiliaries may also be incorporated into the hard surface cleaning composition of the present invention without departing from the spirit of the invention. Examples of suitable auxiliaries which may be used include, but are not limited to, amphoteric surfactants, zwitterionic surfactants, pH buffering agents, dyes, perfumes, enzymes, preservatives, thickeners, hydrotropes, corrosion inhibitors and the like.

A particularly preferred auxiliary component for use in the present invention is a thickening agent used for thickening the composition. Employing a thickening agent in the composition enables the composition to be applied onto vertical surfaces without any attendant dripping or run-off therefrom, and also inhibits dissipation of the composition into porous substrates such as brick or concrete. While any suitable thickening agent may be employed including, but not limited to, stearates and organoclay compounds, a particularly preferred thickening agent is tetraalkyl ammonium bentonite due to its stability over a broad temperature range. The thickening agent will typically be used in an amount of from about 0.1 to about 12% by weight, preferably from about 1 to about 8% by weight, and most preferably from about 2 to about 4% by weight, based on the weight of the composition.

In some cases it is desirable to package the cleaning compositions, according to the invention, in cans, such as aerosol cans to facilitate application of the cleaning compositions in the field. Cans, and particularly aerosol cans, are generally made from steel, so are susceptible to corrosion by products containing water. Products containing water, such as the composition according to the invention, require the addition of a corrosion inhibitor to prevent corrosion of the can and contamination of the formulation in the can. When the formulation according to the invention is in the form of a microemulsion, the microemulsion is susceptible to destabilization by the addition of ions to the formulation. It is therefore necessary to use a corrosion inhibitor that will not contribute to the destabilization of the microemulsion. Corrosion inhibitors that are compatible with the microemulsion composition according to the invention must be selected such that they do not contribute an amount of ions to the formulation that will destabilize the microemulsion. Preferably the inhibitor will be a molecule that has both an oil soluble portion and a water soluble portion. It has been found that an amphoteric surfactant containing an amine functionality in an amount of from about 0.05% to about 2% by weight, and preferably from about 0.25% to about 1.0%, acts as a corrosion inhibitor when combined with the microemulsion composition according to the invention, does not break the microemulsion and is effective in prevention of corrosion. Examples of suitable corrosion inhibitors include the DERIPHAT® amphoteric surfactants, particularly advantageous is DERIPHAT® 151-C, available from Henkel Corporation, Ambler Pa. Other corrosion inhibitors that can be used with the composition according to the invention include, but are not limited to, amine soaps of fatty acids and fatty alkanolamides such as the $C_8$ to $C_{18}$ fatty alkanolamides, examples of which include STANDAMID® alkanolamides, available from Henkel Corporation.

As set forth above, the precise amount of alkyl ester solvent in general, and methyl ester solvent, in particular, present in the composition depends on the type of cleaning to be performed. Hence, if a hard surface is to be completely stripped of any and all coatings thereon, the amount of methyl ester solvent present in the composition will range from about 50 to about 95% by weight, based on the weight of the composition. Similarly, if an undesirable substance, such as graffiti, is to be removed from a coated hard surface without damaging the underlying coating, the amount of methyl ester solvent present in the composition will range from about 15 to about 50% by weight, based on the weight of the composition.

However, another variable associated therewith is the dwell-time of the composition. Thus, if a hard surface is to be completely stripped of any coating substances, as is the case in paint stripping, the dwell-time of the composition on the hard surface will range from about 20 to about 45 minutes.

On the other hand, if an undesirable substance, such as graffiti, is to be removed from a coated hard surface without damaging the underlying coating, the dwell time of the composition on the hard surface will range from about 2 to about 20 minutes.

The present invention will be better understood by the examples which follow, all of which are intended for illustrative purposes only, and are not meant to unduly limit the scope of the invention in any way. Unless otherwise indicated, percentages are on a weight-by-weight basis.

EXAMPLES

A terpene-free cleaning composition was prepared in accordance with the present invention. Its formulation is found in Table 1, below.

TABLE 1

| Component | % wt. |
| --- | --- |
| C8–C10 methyl ester | 46.5 |
| isopropylamine salt of LAS acid | 7.1 |
| propylene glycol n-butyl ether | 9.0 |
| C12–C14 sodium FAS (29%) | 5.3 |
| water | 32.1 |

The physical characteristics of the above-disclosed composition are found in Table 2, below.

TABLE 2

| Characteristic | Value |
| --- | --- |
| pH (as is) | 6.0–8.5 |
| % solids (1 hour, vacuum oven) | 8.3–9.8 |
| Specific Gravity, 25° C. | 0.91–0.95 |
| Cloud Point, lower | 50° F. max |
| Cloud Point, upper | 160° F. min |
| Appearance, 1 cm test tube | clear liquid |

The formulation described in Table 1 was found to be effective in removing graffiti (acrylic spray paint) from a variety of non-porous substrates. A particular advantage of the formulation described in Table 1 is that it can be used to remove cured acrylic spray paint (graffiti) which has been applied over polyurethane paint, without damaging the underlying polyurethane paint. Most conventional graffiti removers will not only remove the undesired graffiti, but also remove or damage the desired underlying paint, resulting in the additional expense of repainting the substrate.

The formulation described in Table 1 also has the following advantages over conventional graffiti removers:

1. Low toxicity
2. Readily biodegradable
3. Primarily naturally derived
4. Low volatility A second terpene-free cleaning composition was prepared in accordance with the present invention. Its formulation is found in Table 3, below.

TABLE 3

| Component | % wt |
| --- | --- |
| $C_{8-10}$ methyl ester | 30.8 |
| cyclohexanone | 15.2 |
| isopropylamine salt of LAS acid | 8.4 |
| propylene glycol n-butyl ether | 9.3 |
| sodium lauryl sulfate (29%) | 4.0 |
| sodium octyl sulfate (40%) | 1.3 |
| water | 31.0 |

The physical characteristics of the above-disclosed composition are found in Table 4, below.

TABLE 4

| Characteristic | Value |
| --- | --- |
| pH (as is) | 6.3 |
| % solids (1 hour, vacuum oven) | 9.36 |
| Specific Gravity. 25° C. | 0.942 |
| Cloud point, lower | 46° F. max |
| Cloud point, upper | 128° F. min |
| Appearance, 1 cm test tube, 25° C. | clear liquid |

What is claimed is:

1. A process for cleaning a hard surface comprising contacting the surface with a cleaning-effective amount of a terpene-free cleaning composition containing:
   (a) from about 2 to about 12% by weight of an oil-soluble anionic surfactant;
   (b) from about 0.2 to about 6% by weight of a water-soluble anionic surfactant;
   (c) from about 3 to about 96% by weight of a primary solvent consisting of a $C_{1-4}$ alkyl ester of a $C_{6-22}$ saturated or unsaturated carboxylic acid;
   (d) from about 2 to about 14% by weight of a short-chain cosurfactant; and
   (e) remainder, water, all weights being based on the total weight of the composition.

2. The process of claim 1 wherein the oil-soluble anionic surfactant is selected from the group consisting of amine salts of dodecylbenzenesulfonic acid, calcium salts of dodecylbenzenesulfonic acid, phosphate esters, and mixtures thereof.

3. The process of claim 1 wherein the oil-soluble anionic surfactant is an isopropylamine salt of dodecylbenzenesulfonic acid.

4. The process of claim 1 wherein the oil-soluble anionic surfactant is present in the composition in an amount of from about 6 to about 8% by weight, based on the weight of the composition.

5. The process of claim 1 wherein the water-soluble anionic surfactant is selected from the group consisting of alkali metal salts of fatty acids, organic base salts of fatty acids, alkyl sulfates, alkyl ether sulfates, alkyl aromatic sulfonates, alkyl sulfonates, alpha olefin sulfonates, sulfosuccinates, and mixtures thereof.

6. The process of claim 1 wherein the water-soluble anionic surfactant is a C12–C14 fatty alcohol sulfate.

7. The process of claim 1 wherein the water-soluble anionic surfactant is present in the composition in an amount of from about 1 to about 2% by weight, based on the weight of the composition.

8. The process of claim 1 wherein the primary solvent is a $C_8$–$C_{10}$ methyl ester.

9. The process of claim 1 wherein the primary solvent is present in the composition in an amount of from about 40 to about 50% by weight, based on the weight of the composition.

10. The process of claim 1 wherein the short-chain cosurfactant is selected from the group consisting of $C_3$–$C_6$ alcohols, glycols, glycol ethers, pyrrolidones, glycol ether esters, and mixtures thereof.

11. The process of claim 1 wherein the short-chain cosurfactant is propylene glycol n-butyl ether.

12. The process of claim 1 wherein the short-chain cosurfactant is present in the composition in an amount of from about 8 to about 10% by weight, based on the weight of the composition.

13. The process of claim 1 wherein the composition has a pH value of less than about 9.

14. The process of claim 1 wherein the composition has a thermal stability ranging from about 10 to about 70° C.

15. The process of claim 1 wherein the primary solvent and water are present in the composition in a ratio by weight ranging from about 50:1 to about 1:4.

16. The process of claim 1 wherein the primary solvent and water are present in the composition in a ratio by weight of about 1.5:1.

17. The process of claim 1 wherein the terpene-free cleaning composition further comprises from about 1 to about 35% by weight of a cyclic ketone.

18. The process of claim 1 wherein the cleaning composition further contains a thickening agent.

19. The process of claim 17 wherein the cyclic ketone is cyclohexanone.

20. The process of claim 1 wherein the thickening agent is tetraalkyl ammonium bentonite.

* * * * *